J. W. GUTHRIE.
VALVE MECHANISM FOR ENGINES.
APPLICATION FILED MAR. 18, 1909.
959,339.
Patented May 24, 1910.
2 SHEETS—SHEET 2.
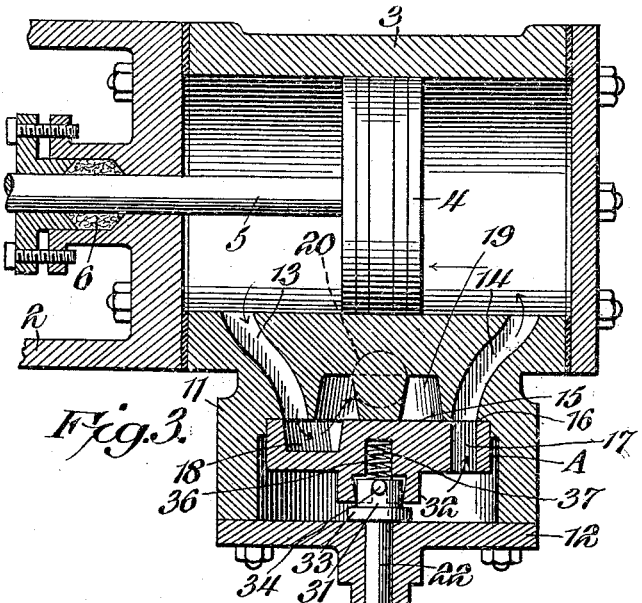
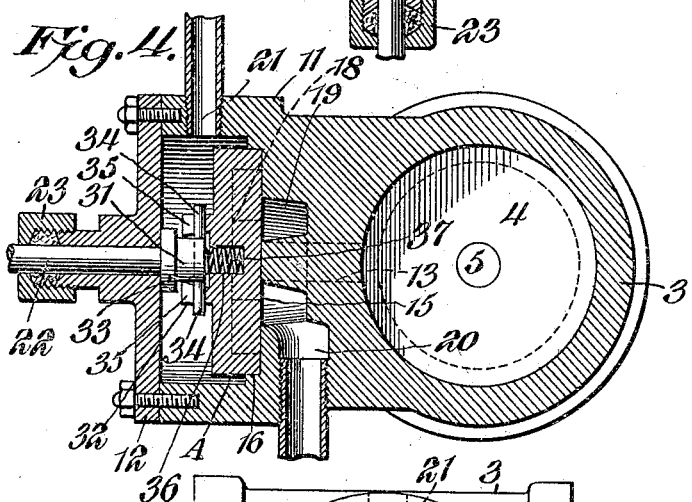
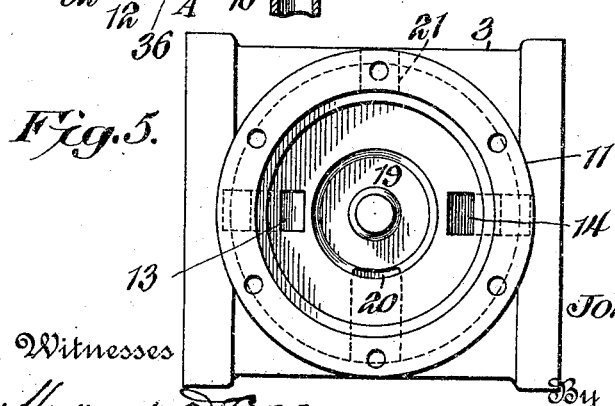
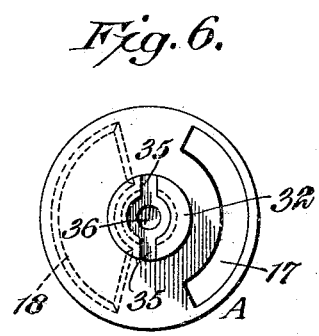
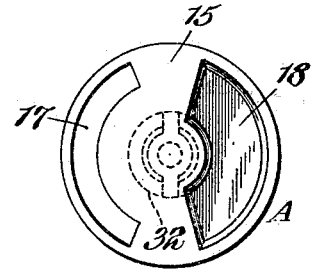
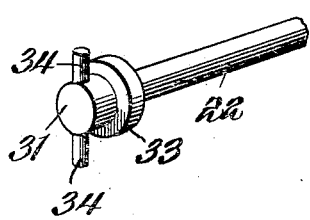
Witnesses
Howard F. Orr.
C. Bradway.
John W. Guthrie, Inventor,
By C. G. Siggers,
Attorney

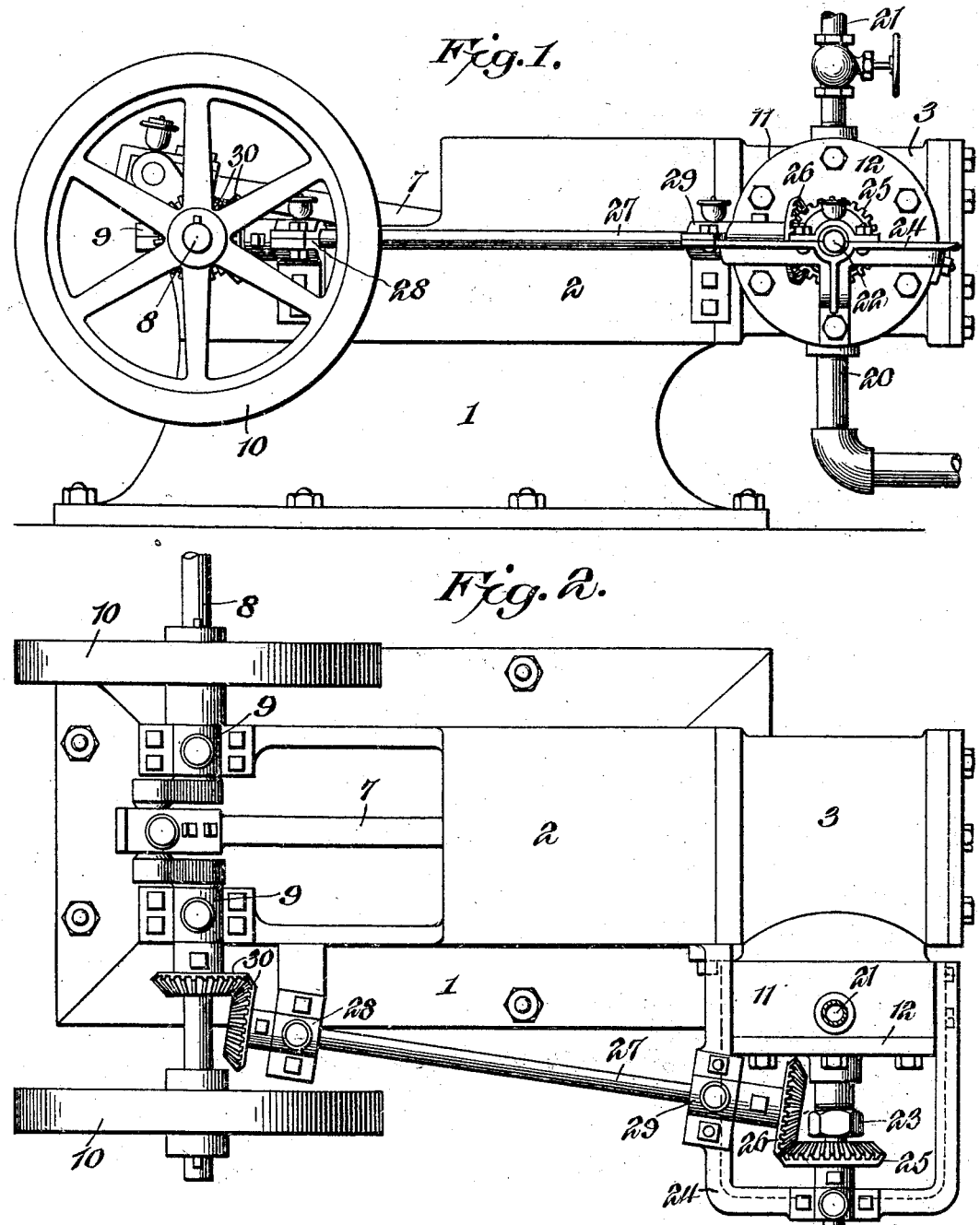

UNITED STATES PATENT OFFICE.

JOHN W. GUTHRIE, OF FALLS CREEK, PENNSYLVANIA.

VALVE MECHANISM FOR ENGINES.

959,339.　　　　　Specification of Letters Patent.　　Patented May 24, 1910.

Application filed March 18, 1909. Serial No. 484,190.

*To all whom it may concern:*

Be it known that I, JOHN W. GUTHRIE, a citizen of the United States, residing at Falls Creek, in the county of Clearfield and State of Pennsylvania, have invented a new and useful Valve Mechanism for Engines, of which the following is a specification.

This invention relates to steam engines, and more particularly to valve mechanisms of that type in which a rotary valve opens and closes the ports to admit and exhaust the steam alternately to and from the opposite sides of the piston for reciprocating the latter.

The invention has for one of its objects to improve and simplify the construction and operation of apparatus of this character which is comparatively simple and inexpensive to manufacture, reliable and efficient in use, and composed of few parts.

Another object of the invention is the provision of an improved connecting means between the rotary valve and its actuating means whereby the valve will be effectively maintained on its seat and rotated without undue binding.

With these objects in view and others, as will appear as the description proceeds, the invention comprises the various novel features of construction and arrangement of parts which will be more fully described hereinafter and set forth with particularity in the claims appended hereto.

In the accompanying drawings, which illustrate one embodiment of the invention, Figure 1 is a side view of the engine. Fig. 2 is a plan view thereof. Fig. 3 is a horizontal section of the cylinder, steam chest and rotary valve. Fig. 4 is a transverse section taken centrally through the steam chest. Fig. 5 is a side view of the steam chest with the cover plate thereof removed. Figs. 6 and 7 are views of opposite sides of the rotary valve. Fig. 8 is a perspective view of the valve stem.

Similar reference characters are employed to designate corresponding parts throughout the views.

In the present instance, I have elected to illustrate the invention applied to a simple double-acting steam engine, but it is to be understood that it is not necessarily limited to this use.

Referring to the drawings, 1 designates the bed of the engine which supports a crosshead guide or frame 2, to which is secured the horizontally-disposed cylinder 3. In the cylinder 3 in a piston 4, Fig. 3, the piston rod 5 of which passes through a packing box 6 and is connected with a cross head (not shown), the cross head being connected, in turn, by a connecting rod 7 with a single-throw crank shaft 8 mounted on the engine bed in bearings 9. This crank shaft is provided with one or more fly wheels or pulleys 10 secured to opposite ends thereof.

Formed on one side of the cylinder 3 is an annular steam chest 11 having its outer end closed by a cover plate or head 12. In the wall between the steam chest and cylinder are ports 13 and 14 through which steam is admitted to the cylinder or exhausted therefrom. Arranged within the steam chest is a rotary valve designated generally by A which has a flat inner face 15 bearing against the inner wall of the steam chest, which is counterbored to form a flat seat 16. The rotary valve, which is in the form of a disk, has an arcuate port 17 for admitting live steam to either port or passage 13 or 14, according to the position of the valve, and at a point diametrically opposite from the port 17, the inner face of the valve is provided with an arcuate cavity 18 adapted to register with either passage 13 or 14 for conducting away the exhaust. The radial dimension of the cavity 18 is such that it will simultaneously communicate with either passage 13 or 14, and an annular chamber 19 formed in the wall constituting the valve seat, the said chamber communicating with an exhaust conduit 20, as shown in Fig. 4. The steam chest is supplied with live steam through a conduit 21 that admits steam to the space in front of the valve, so that the steam can pass through the port 17 to the engine cylinder.

The valve is operated by a rotatable stem or spindle 22 passing centrally through the head 12 of the valve chest, there being a stuffing box 23 for preventing leakage around the stem. The outer end of the stem is supported in a U-shaped bracket 24, Figs. 1 and 2, suitably secured to the engine. The stem is equipped with a gear wheel 25 that meshes with a gear wheel 26 on the shaft 27 which is mounted in bearings 28 and 29, and has its forward end connected with the crank shaft by intermeshing gear wheels 30. The shaft 29 is inclined so that its forward end is located inwardly toward the crank so as to permit the pulley or fly wheel 10 to be as close to the crank shaft bearing as possible.

The end of the valve stem disposed in the valve chest, is formed with a head 31 that engages in a chambered boss 32 on the rotary valve, and around the head of the valve stem is an annular flange or collar 33 which bears against the inner face of the valve chest head. The head 31 of the valve stem has radially-disposed fingers 34 which engage in diametrically arranged recesses 35 in the walls of the boss 32. The valve is provided with a central bore 36 alining with the chamber of the boss for receiving a spring 37 which is normally under compression so as to hold the valve against its seat and the collar 33 against the head of the valve chest so as to thereby prevent leakage of steam between the valve and its seat, and also between the collar and valve chest head. The walls of the chamber of the boss 32 are undercut so as to provide a limited relative movement between the valve and its stem. It will thus be seen that a flexible joint is provided between the valve and stem, which insures free working of the valve without binding in case the stem and valve should not axially coincide. Furthermore, the valve can be readily detached from the stem when repair or renewal is necessary.

It is obvious that the valve will rotate continuously with the operation of the engine, and when the valve is in the position shown in Fig. 3, the live steam is admitted to the rear side of the piston 4 through the port 17 and passage 14, to drive the piston forwardly. At the same time, the exhaust steam is driven out of the front end of the cylinder through the passage 13, cavity 18, exhaust chamber 19 and exhaust conduit 20. At a suitable time, the ports 17 and 18 reach the passages 13 and 14 respectively, so that the course of the steam admitted and exhausted, will be reversed so as to thereby reverse the stroke of the piston. By the rotation of the valve stem, the fingers or members 34 cause the valve to rotate for bringing the proper ports into register for effecting the reciprocation of the engine piston. The speed of the engine, of course, can be controlled by a governor operating on the throttle valve, as will be readily understood.

From the foregoing description, taken in connection with the accompanying drawings, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims appended hereto.

Having thus described the invention, what I claim as new and desire to secure by Letters-Patent, is:—

1. In an engine, the combination of a cylinder, a piston therein, a valve chest, ports between the valve chest and ends of the cylinder, a rotary valve periodically registering with the said ports for admitting and exhausting the steam, a valve stem, a flexible connection between the valve and stem, means driven by the engine for rotating the stem, and a spring interposed between the valve and inner end of the stem tensioned to move the stem and valve apart for holding the valve rotatably on its seat.

2. In an engine, the combination of a cylinder, a piston therein, a valve chest, ports between the valve chest and ends of the cylinder, a rotary valve periodically registering with the said ports for admitting and exhausting the steam, a valve stem, a flexible connection between the valve and stem, a spring interposed between the stem and valve for holding the latter against its seat, and means driven by the engine for rotating the stem.

3. In an engine, the combination of a cylinder, a rotary valve for controlling the admission and exhaust of steam, a chest for the valve, a stem extending into the chest through one of the walls thereof and having an abutment, said valve having a chambered boss provided with diametrically disposed recesses which extend inwardly from the outer end of the boss, a head on the stem disposed in the chamber, laterally-extending members on the head loosely engaging in the said recesses for rotating the valve by the members, and a spring housed in the valve and tensioned to hold the latter against the seat and the said abutment on the stem against the wall of the valve chest.

4. In an engine, the combination of a cylinder, a valve chest, a rotary valve therein having ports for admitting and exhausting steam to and from the cylinder, said valve chest having a central chamber provided with undercut walls, a valve stem extending into the chamber, a cylindrical head on the inner end of the stem disposed in the chamber, a collar adjacent the head bearing against the wall of the valve chest, means connecting the head with the valve for turning with the stem, a spring interposed between the valve and head for holding the valve against its seat and the collar against the wall of the valve chest, and a stuffing box through which the valve stem passes.

In testimony that I claim the foregoing as my own, I have hereto affixed my signature in the presence of two witnesses.

JOHN W. GUTHRIE.

Witnesses:
 JOHN H. SIGGERS,
 DAVID R. WAGNER.